July 31, 1956 H. W. LEVERENZ 2,757,304

TRI-COLOR PHOSPHOR SCREENS

Filed Jan. 13, 1954

2 Sheets-Sheet 1

INVENTOR
Humboldt W. Leverenz
BY
W. S. Hill
AGENT

July 31, 1956 H. W. LEVERENZ 2,757,304

TRI-COLOR PHOSPHOR SCREENS

Filed Jan. 13, 1954

2 Sheets-Sheet 2

INVENTOR
Humboldt W. Leverenz
BY
W. S. Hill
AGENT

1

2,757,304

TRI-COLOR PHOSPHOR SCREENS

Humboldt W. Leverenz, Princeton, N. J., assignor to Radio Corporation of America, a corporation of Delaware Application January 13, 1954, Serial No. 403,770

13 Claims. (Cl. 313—92)

Figure 1:
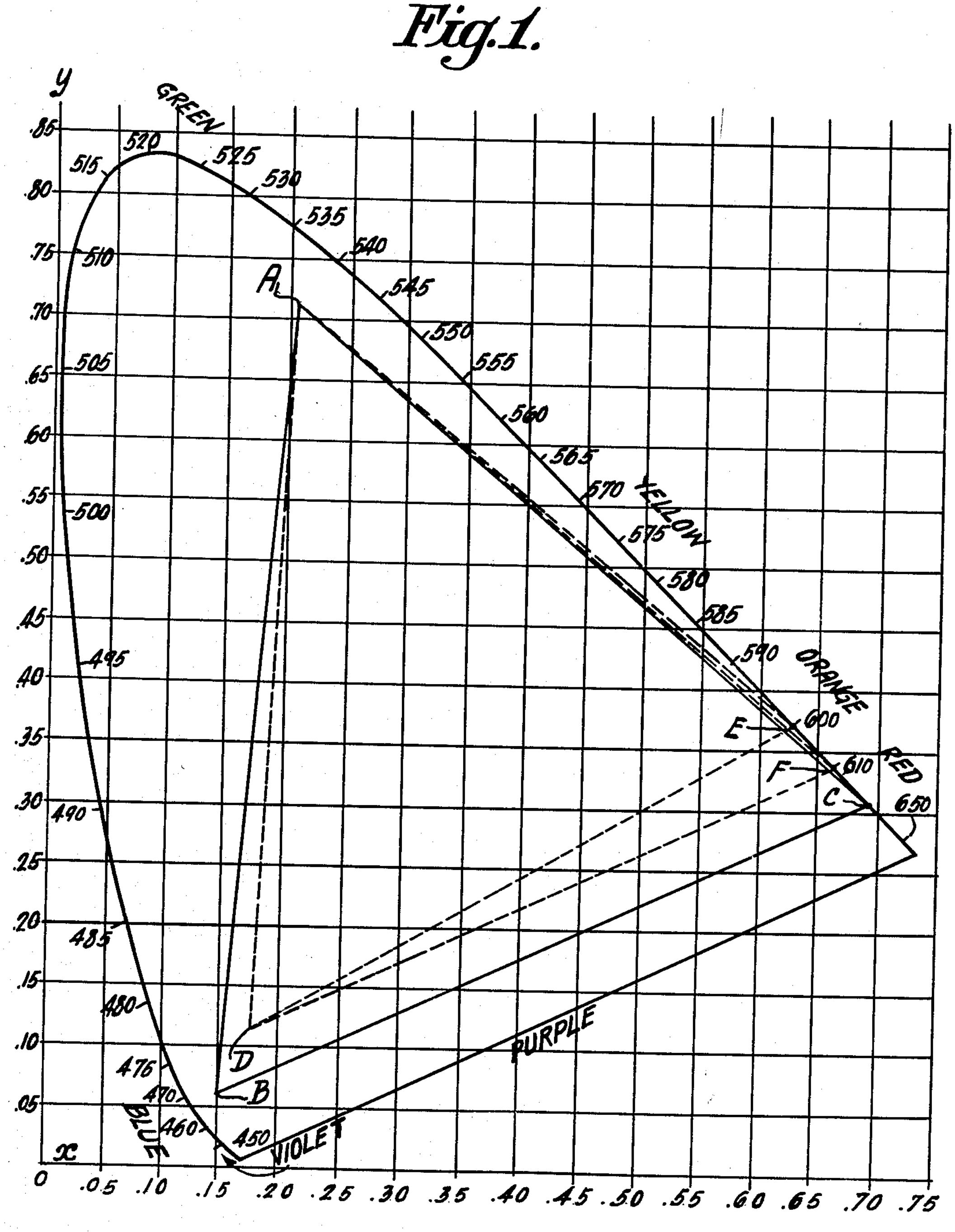

This application is a continuation-in-part of my previously filed application, Serial No. 278,468, filed March 25, 1952, now abandoned.

This invention relates to viewing screens such as may be used in color television systems. Particularly, the invention relates to luminescent screens for color television using an improved combination of phosphors.

A number of different types of viewing screens have been described in the prior art for use in single kinescope type color reproducers for color television. One of these types employs a large number of ruled lines of phosphors emitting in three different colors with the different color-emitting phosphors occurring in cyclic succession. This type of screen is described in U. S. Patent 1,934,821 and in British Patent 388,623. Another type of screen is composed of a multiplicity of groups of phosphor dots, each group consisting of 3 dots and each of the dots in a group being of a different color-emitting phosphor. Screens of this type are described, for example, in U. S. Patent 2,508,267.

Both the line screen and the dot screen can be laid down by using a silk screen printing technique which is well known in the art. For a description of silk screen technique of printing the line type screen see "Phosphor-screen application in color kinescopes," Proc. I. R. E., vol. 39, pp. 1230–1236, October 1951, by N. S. Freedman and K. M. McLaughlin.

There are also three-color type kinescope tubes employing a non-planar arrangement of phosphor elements sensitive to the direction of arrival of an electron beam. Although there are many variations of this general type of screen, such as those employing a multiplicity of tiny pyramids or ridges, an example is described in British Patent 562,168. If the viewing screen is composed of a multiplicity of transparent ridges, phosphors emitting each of two different colors are deposited as strips along the opposite sides of each ridge. A phosphor emitting a third color can be deposited on the opposite side of the screen. Since, in this type of three-color screen, the phosphors are not all on the same side of the screen, more than one electron beam is required for excitation.

With the line or dot type of screen previously referred to, it is possible to use only a single electron beam, although more than one beam may be utilized if desired.

Another type of color reproducer comprises three kinescopes, each kinescope producing an image in a different color. Usually the color images are red, green and blue. The color images are projected in registry upon a single surface thereby producing a composite multicolor image to the viewer.

In designing a commercially usable three-color television reproducer, the determination of the best geometrical arrangement for the color-emitting phosphors is but one of the important problems. Selection of the optimum combination of phosphors emitting the different colors is also a problem that has proved to be very difficult of solution. The three colors to be used may be red, green,

2 and blue. There are literally scores of phosphors emitting in the green region of the spectrum and also a large number emitting in the blue region. The number of known phosphors emitting strongly in the red region is, however, quite limited. It is not possible to make a commercially acceptable three-color luminescent screen by random selection of phosphors emitting the three different colors under cathode ray excitation. Also, prior to the present invention, no tri-color three-phosphor kinescope viewing screen had been made available to the public which had satisfactory color matching at all commonly used current densities of cathode ray excitation.

In a three-color television system it is desirable that the picture brightness should be not less than that of black-and-white home television reproduction. Besides the desirability of having the highest possible picture brightness, it is also desirable that each phosphor have the highest possible efficiency, that is, highest possible light output compared to excitation current density. It is further desirable that the efficiencies of all three phosphors used be approximately equal, or, at least, close together so that the grid modulation characteristic of the electron gun will be the same for all phosphors. This is required in order to have good color fidelity. In one type of three-color kinescope previously used, the red-emitting phosphor was cadmium borate with manganese activator. Manganese-activated zinc silicate ("willemite") was used as the green-emitting phosphor, and calcium magnesium silicate with titanium activator was used as the blue emitter. With this type of screen, a color filter having a sharp rejection band at the yellow sodium lines was found to be necessary to compensate for the emission color of the cadium borate phosphor which was red-orange instead of the desired purer red. Although a didymium glass having this rejection band is available and although the glass acts as a neutral filter at other wavelengths, it absorbs 40 to 50 per cent of the light, thus greatly reducing overall picture brightness. Another undesirable feature was the relatively low efficiency of the borate phosphor which necessitated reduction of the light output of the more efficient green- and blue-emitting phosphors in order to achieve color balance.

An improved three-color viewing screen was later made. In this screen the red-emitting phosphor was a particular crystalline form of zinc orthophosphate with manganese activator. (See co-pending application Serial No. 202,734 of A. L. Smith et al., filed December 26, 1950.) The green-emitting phosphor was the same zinc silicate as that used in the screen just previously described. The blue-emitting phosphor was also the same calcium magnesium silicate with titanium activator. This screen is the subject of a co-pending application of A. L. Smith, Serial No. 291,212, filed June 2, 1952. This screen was a considerable improvement in many ways over that first described, i. e., it enabled elimination of the didymium glass filter, however the efficiency of the red-emitting zinc phosphate phosphor is considerably lower than that of the green-emitting phosphor. Consequently, it was necessary to use widely different grid modulation characteristics when exciting the different phosphors.

The present invention is an improved form of kinescope system, utilizing a novel combination of phosphors which eliminates the serious disadvantages of prior art screens. In this system the green-emitting phosphor is preferably the high efficiency zinc orthosilicate with manganese activator, but it is also possible to use any green-emitting phosphor having a dominant emission wavelength of about 510–550 millimicrons preferably about 535 and a color saturation value about the same as that of the selenide phosphor to be later described. But the blue-emitting phosphor is one having a dominant emission wavelength of less than about 485, preferably less than 470 millimicrons, a luminescence efficiency at least about equal to that of standard "willemite" under normal operating cathode ray conditions and having a color saturation value about the same as that of the red-emitting selenide phosphor to be later described. A preferred example of this type of phosphor is a very high efficiency material selected from the class consisting of zinc sulfide and zinc seleno-sulfide with silver activator. Although not preferred, minor proportions of cadmium can be substituted for part of the zinc in these phosphors. The red-emitting phosphor is selected from the class consisting of zinc selenide and zinc cadmium selenide with copper activator. In these phosphors it is possible to substitute small percentages of sulfur for some of the selenium.

A general object of the present invention is to provide an improved multicolor television picture reproducer.

Another object of the present invention is to provide an improved three-color kinescope viewing screen having higher overall efficiency than prior art viewing screens.

Another object of the present invention is to provide an improved kinescope system exhibiting improved color fidelity.

Another object of the invention is to provide an improved three-color kinescope viewing screen in which the efficiencies of the three phosphors are all relatively high.

Another object of the invention is to provide an improved three-color kinescope viewing screen in which a larger range of colors is possible than with formerly known screens.

Another object of the invention is to provide an improved three-color screen for color television kinescopes in which all of the phosphors can be applied satisfactorily using large scale production techniques.

Still another object of the invention is to provide an improved three-color viewing screen for cathode ray kinescopes, which is capable of being operated at relatively high current densities.

Figure 2:
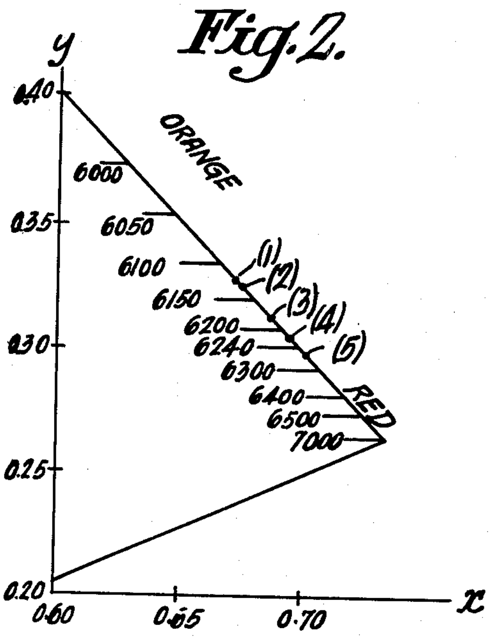
Figure 4:
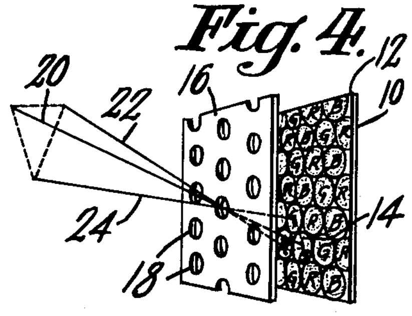
Figure 3:
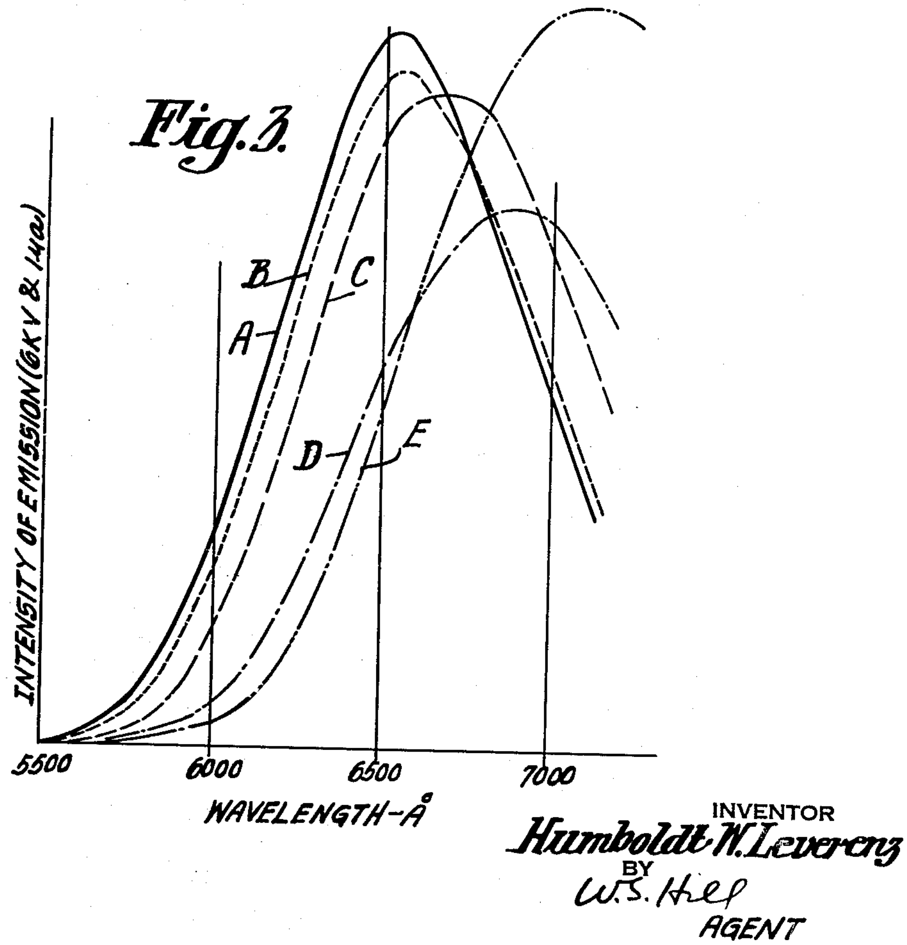

These and other objects will be more apparent and the invention will be more readily understood from the following detail description and the illustrative drawing of which, Fig. 1 is a C. I. E. (Conference International d'Eclairage) diagram having plotted thereon points representing examples of each of the three phosphors included in the viewing screens of the present invention, and also including, for purposes of comparison, plots of points representing phosphors used in prior art screens, Fig. 2 is a portion of a C. I. E. diagram having plotted therein points representing the peak emission of zinc selenide phosphor with copper activator and zinc selenide with copper activator and having various small amounts of cadmium substituted for a part of the zinc, Fig. 3 is a family of emission curves for the same selenide phosphors plotted on Fig. 2, and Fig. 4 is an illustration of a portion of a viewing screen and shadow mask arrangement with one type of geometrical arrangement of color phosphor elements, which it is possible to use as a color television viewing screen in accordance with the present invention.

A feature of the present invention is the selection of a particular combination of phosphors for use in a picture reproducer, particularly suitable for color television, which will have none of the disadvantages of the prior art screens described above, yet will be practical to apply in commercial tube production to produce viewing screens which are satisfactory from the consumer viewpoint in every way.

One of the phosphors preferably used in the screens of the present invention is rhombohedral zinc silicate activated with manganese. The amount of manganese activator may be about 0.1 to 1.0% by weight, but this may be varied. The orthosilicate is preferred. It will be understood that the indicated range of manganese activator is the preferred range. Increased percentages of manganese can be used. This material is a high efficiency phosphor emitting in the green region of the spectrum when excited by cathode rays. It is also possible to use other green-emitting phosphors having dominant emission wave-length of about 510–550 millimicrons and a color saturation value about the same as that of the red-emitting phosphor.

A preferred example of a blue-emitting phosphor used in the screens of the present invention is a material from the class consisting of zinc sulfide and zinc seleno-sulfide containing about 0.005 to 0.025% by weight silver activator. It is possible to use up to about 5% by weight cadmium substituted for part of the zinc in the phosphors. These phosphors are prepared by firing at a temperature of between about 750° and 1250° C. using about 2% of a flux such as sodium chloride. The emission shade of this phosphor can be varied by varying the firing temperature and also by varying the ratio of sulfur to selenium. The ratio by weight of sulfur to selenium should be at least 8:1. The blue emission color deepens as the firing temperature is raised. Preparation and properties of this type of phosphor are more fully described in U. S. Patents 2,477,070 and 2,505,621. It is also possible to use some other blue-emitting phosphor having a dominant emission wavelength of less than 485 millimicrons and a color saturation value about the same as that of the red-emitting phosphor.

The third phosphor used in the screens of the present invention is one selected from the class consisting of cubic zinc selenide containing about 0.003 to 0.03% by weight copper activator and prepared by firing within a temperature range of about 800° C. to 1100° C., and zinc cadmium selenide activated with the same amount of copper, in which the ratio by weight of zinc to cadmium is at least 8:1. In these phosphors it is possible to substitute up to about 10% sulfur for part of the selenium.

Referring now to Fig. 1, colorists make use of the C. I. E. chromaticity diagram such as shown in this figure. The entire range of colors to which the normal eye is sensitive is represented within the horseshoe-shaped figure, the periphery of which bears numbers indicating pure spectral wavelengths in millimicrons. Any color may be designated as having certain X and Y coordinates which specify the color components in terms of an ideal set of primary colors. A three-color television kinescope screen should use primary colors with coordinates which lie as close as possible to certain regions on the periphery of the horseshoe of the C. I. E. diagram and which are, at the same time, separated from each other as widely as possible so that lines joining their plotted points will enclose as large an area on the diagram as possible. This is desirable so that as large a range of colors as possible can be seen on the viewing screen.

On Fig. 1, the point designated "A" represents a green-emitting rhombohedral zinc orthosilicate phosphor containing 0.3% by weight manganese activator. This is a standard "willemite" of high emission efficiency. Since it is used as a standard, in this case, its relative peak efficiency may be designated as 100. The point B represents a blue-emitting cubic zinc sulfide phosphor containing 0.015% by weight silver activator and prepared using a firing temperature of 850° C. Compared to the standard "willemite" it has a relative peak efficiency of 210. Prior to the development of the screens of the present invention, this very high efficiency blue-emitting phosphor could not be used, except when admixed with inert or inefficient material, in three-color screens, because of the low efficiency of the red-emitting materials which were being used. The point C represents a preferred red-emitting phosphor used especially in screens of the present invention. It is ZnSe(97)CdSe(3):Cu(0.01) and is prepared using 2% by weight ammonium chloride as a flux. (The figures in parenthesis indicate parts by weight.) In this phosphor the ratio by weight of zinc to cadmium is about 25:1. This phosphor has a relative peak efficiency of over 90.

In order to show the improvement over certain prior art three-color phosphor combinations formerly used in color television screens, a number of other points have been plotted on Fig. 1. Point D represents a formerly used blue-emitting calcium magnesium silicate containing 1% by weight titanium activator. This phosphor has a relative peak efficiency of only about 22. Point E represents a red-emitting cadmium borate phosphor containing 1% by weight manganese activator. This phosphor has a relative peak efficiency of only about 19. One of its other disadvantages is that its emission is orange rather than deep red—as can be seen by the position of its coordinates on the C. I. E. diagram. Another red-emitting phosphor which has been used more recently in three-color screens is the rhombohedral zinc phosphate containing 1% by weight manganese activator and represented by point F on the diagram. Screens utilizing this phosphor are described and claimed in a previously mentioned co-pending application of A. L. Smith. The relative peak efficiency of the phosphate phosphor is only about 20 but its peak emission color is a much purer red than the previously used cadmium borate phosphor.

Point F on the diagram of Fig. 1 also represents the emission color of cubic zinc selenide activated with 0.01% by weight copper. Although having a spectral color emission characteristic about the same as that of the previously described phosphate its relative peak efficiency is about 100. Because its relative efficiency is so high, the very high efficiency blue-emitting sulfide phosphor can be used with it in the screens of the present invention.

It will be noted that points C and F both represent red-emitting phosphors either of which may be a component of screens of the present invention.

The area within the solid line triangle ABC on the C. I. E. diagram of Fig. 1 represents all the color combinations possible using the preferred phosphors which are a part of color reproducers of the present invention. The areas within the dotted line triangles represent the color combinations possible with the phosphors used in the prior art three-color screens. It can be seen that these latter areas are considerably less than the area within the solid line triangle. Thus, the color range of the screens of the present invention is considerably greater than in the prior art screens. It can also be seen that the blue and red primary colors of the present screens are deeper.

Another advantage of the screens of the present invention is in the ability to vary the depth of the red color of the red-emitting component without materially affecting the efficiency. This is illustrated in Fig. 2. Fig. 2 shows only that portion of the C. I. E. diagram of Fig. 1, located adjacent the lower right hand (red) corner. This diagram is on a considerably larger scale than the diagram of Fig. 1. Point 1 on this diagram represents copper activated zinc selenide. Points 2, 3, 4, and 5, respectively, represent zinc cadmium selenide phosphors activated with 0.01% by weight copper in which the cadmium selenide is present in the amount of 1, 3, 6 and 10 weight percent. It will be noted that, as the amount of cadmium selenide is increased, the red emission color is deepened.

Fig. 3 is a graph of the emission characteristics of the five selenide phosphors the C. I. E. coordinates of which were shown in Fig. 2. Curves A, B, C, D, and E correspond to the phosphors whose coordinates are plotted at 1, 2, 3, 4, and 5 respectively of Fig. 2. The curves show the emission band observed and peak wavelength. These spectral distribution curves of emission were taken at 6 kv. and 1 μa. The curves are not drawn exactly to scale. All of the phosphors for which data are given in Figs. 2 and 3, except that designated as "5," on Fig. 2, were prepared by firing in a nitrogen atmosphere at 1000° C. No. 5 was fired at 850° C. All of these phosphors were also prepared using about 2% by weight of halide fluxes, i. e., ammonium chloride or sodium chloride.

In a similar way, the emission color of the silver-activated zinc sulfide can be varied preferably by substituting small percentages of selenium for part of the sulfur. The manner of thus controlling the emission color of the sulfide phosphor is more fully disclosed in the previously referred to U. S. Patents 2,477,070 and 2,505,621.

Another advantage in using the phosphors containing cadmium or selenium is that these phosphors absorb visible ambient light and thereby increase contrast in a televised picture being viewed in a partially lighted room.

The red-emitting phosphors utilized in screens of the present invention have been found to exhibit much higher peak output of luminescence than the red-emitting phosphors used in the best tri-color screens previously known to the industry. In the table below a comparison is given of relative peak light output between a preferred zinc phosphate phosphor activated with manganese and a preferred red-emitting zinc cadmium selenide phosphor, with copper activator, utilized in screens of the present invention. The preferred selenide contains 97 weight per cent ZnSe and 3 weight per cent CdSe. Both phosphors are compared in brightness with a standard "willemite." Peak outputs are shown with the screen operated at 8 kv. and intensities of bombardment of 2, 35, and 500 $\mu a/cm.^2$ D. C. under nonscanning conditions without regard to spectral location and distribution.

| Phosphor | Peak Outputs | | |
|---|---|---|---|
| | 8 kv. 2 $\mu a./cm.^2$ | 8 kv. 35 $\mu a./cm.^2$ | 8 kv. 500 $\mu a./cm.^2$ |
| Standard "Willemite" $Zn_2SiO_4$: Mn | 100 | 100 | 100 |
| $Zn_3(PO_4)_2$:Mn | 21 | 26 | 31 |
| ZnSe(97)CdSe(3):Cu(0.01) | 54 | 109 | 200 |

As the current density of intended operation of these viewing screens is increased, it is preferable to increase activator proportions in all of the phosphors utilized in order to obtain highest possible light output.

An example of one form of tri-color television kinescope viewing screen, having a shadow mask arrangement, and constructed in accordance with the principles of the present invention, is shown in Fig. 4. The screen comprises a transparent glass base plate 10 having arranged on one side 12 thereof a multiplicity of closely spaced phosphor dots trios 14. Each trio includes a dot R one of the red-emitting phosphors previously referred to, i. e., phosphor from the class consisting of cubic zinc selenide activated with 0.003 to 0.03% by weight copper, and zinc cadmium selenide activated with 0.003 to 0.03% by weight copper, and in which the ratio by weight of zinc to cadmium is at least 8:1. Each trio also includes a dot G of a green-emitting phosphor which is rhombohedral zinc silicate activated with 0.1 to 1.0% by weight manganese. Each trio further includes a dot B of a blue-emitting phosphor which is a material from the class consisting of zinc sulfide activated with 0.005 to 0.025% by weight silver and zinc seleno-sulfide activated with 0.005 to 0.025% by weight silver and in which the ratio by weight of sulfur to selenium is at least 8 to 1. The centers of these three dots of each trio lie at the corners of an equilateral triangle. The trios themselves lie at the corner of an equilateral triangle of larger size.

Spaced in front of the plate 10 is a shadow mask 16 provided with a multiplicity of holes 18. The ratio of holes to phosphor dots is 1:3, each hole being associated with one dot trio. The holes, themselves, are arranged so that they are located at the corners of equilateral triangles.

The mask and screen arrangement above described is intended to be used in a kinescope tube with means for projecting three electron beams the axes of which are shown as 20, 22, and 24. These beams are located 120° apart about the tube axis and are converged to a point at the plane of the shadow mask. The convergence angle of the beams, the positioning of the shadow mask with respect to the glass plate 10, and the arrangement of the holes in the shadow mask with respect to the phosphor dot trios, all cooperate to produce the result that when each electron beam is scanned across the screen it strikes only phosphor dots emitting one particular color.

The above type of screen is only one of a number of different arrangements which falls within the scope of the present invention. The general type is a screen composed of discrete elements of the phosphors emitting each of the three different colors regardless of the particular shape of each of the elements and their specific geometrical arrangement on the screen. If intended for use in the usual type of television kinescope tube, the base plate should be of glass and the phosphor elements are normally disposed all on one surface of the plate. If the screen is to be viewed by front-surface light rather than transmitted back-surface light, the base plate, or, at least its surface, may be an opaque insulating material such as a ceramic other than glass or it may be metal. By base plate is meant, in general, a substrate material on which the phosphor elements are disposed, whether the plate be planar or non-planar, whether it be a single member or a plurality of members, and whether the phosphor elements be disposed on one side or more than one side.

Although zinc orthosilicate with manganese activator is the preferred green-emitting phosphor for the screens of the present invention, it is also possible to use zinc-aluminate:manganese and zinc-gallate:manganese. For the blue-emitting phosphor, calcium tungstate or calcium-magnesium-silicate:titanium can be used although less preferably.

There have thus been described improved kinescope viewing screens for color television receivers in which a greatly improved red-emitting phosphor is used. Although preferred examples of blue-emitting and green-emitting phosphors have been given as examples for use in these screens, it is also possible to use other phosphors having color emission characteristics, decay characteristics, color saturation values and emission efficiencies which adequately match those of the red-emitting zinc selenide.

What is claimed is:

1. A luminescent viewing screen comprising a base plate having disposed on a surface thereof a multiplicity of groups of discrete phosphor elements arranged in a predetermined order of cyclic succession, each of said groups consisting of a red-emitting element in which the phosphor is selected from the class consisting of zinc selenide and zinc cadmium selenide in which the ratio of zinc to cadmium is at least 8:1 by weight and containing about 0.003 to 0.03% by weight copper activator, a blue-emitting element in which the phosphor is selected from the class consisting of zinc sulfide and zinc seleno-sulfide in which the ratio of sulfur to selenium is at least 8:1 by weight and containing about 0.005 to 0.025% by weight silver activator, and a green-emitting element in which the phosphor is zinc silicate with manganese activator.

2. A screen according to claim 1 in which said base plate is composed of transparent glass.

3. A screen according to claim 1 in which the phosphor of said red-emitting element consists essentially of zinc cadmium selenide in which the ratio by weight of zinc to cadmium is about 25:1 and which contains about 0.01% by weight copper activator.

4. A screen according to claim 1 in which the phosphor of said blue-emitting element consists essentially of cubic zinc sulfide containing about 0.015% by weight silver activator.

5. A screen according to claim 1 in which the phosphor of said green-emitting element consists essentially of rhombohedral zinc orthosilicate containing about 0.3% by weight manganese activator.

6. A screen according to claim 1 in which the phosphor of said red-emitting element is composed of zinc cadmium selenide in which the ratio by weight of zinc to cadmium is about 25:1 and which contains about 0.01% by weight copper activator, the phosphor of said blue-emitting element is composed of cubic zinc sulfide containing about 0.015% by weight silver activator, and the phosphor of said green-emitting element is composed of rhombohedral zinc orthosilicate with manganese activator.

7. A luminescent viewing screen comprising a base plate having disposed on at least one surface thereof a multiplicity of regularly spaced different discrete elements arranged in a predetermined order of cyclic succession each of said elements consisting essentially of a phosphor capable of emitting in one of three different colors when bombarded with cathode rays, the first of said phosphors selected from the class consisting of zinc selenide and zinc cadmium selenide in which the ratio of zinc to cadmium is at least 8:1 by weight and which contains about 0.003 to 0.03% by weight copper activator, the second of said phosphors selected from the class consisting of zinc sulfide and zinc seleno-sulfide in which the ratio of sulfur to selenium is at least 8:1 by weight and which contains about 0.005 to 0.025% by weight silver activator, and the third of said phosphors being zinc silicate with manganese activator.

8. A screen according to claim 7 in which said base plate is the glass viewing screen of a television kinescope tube and all of said elements are disposed on the same side thereof.

9. A tri-color kinescope tube including a viewing screen comprising a base plate having disposed on a surface thereof a multiplicity of groups of discrete phosphor elements arranged in a predetermined order of cyclic succession, each of said groups consisting of a red-emitting element, a green-emitting element and a blue-emitting element, the phosphor of said red-emitting element having a dominant emission wavelength of at least about 600 millimicrons and being selected from the class consisting of zinc selenide and zinc cadmium selenide in which the ratio of zinc to cadmium is at least 8:1 by weight and containing about 0.003 to 0.03% by weight copper activator, the phosphor of said green-emitting element having a dominant emission wavelength of about 510–550 millimicrons, the phosphor of said blue-emitting element having a dominant emission wavelength of less than about 485 millimicrons, the phosphors of said green-emitting and said blue-emitting elements having a luminescence efficiency at least about equal to that of standard "willemite" under normal operating cathode ray conditions, and said green-emitting and said blue-emitting elements also having color saturation values about the same as that of said selenide phosphor.

10. A tri-color kinescope including a viewing screen comprising a base plate having disposed on a surface thereof a multiplicity of groups of discrete phosphor elements arranged in a predetermined order of cyclic succession, each of said groups consisting of a red-emitting element, a green-emitting element and a blue-emitting element, the phosphor of said red-emitting element having a dominant emission wave length of at least 600 millimicrons and being selected from the class consisting of zinc selenide and zinc cadmium selenide in which the ratio of zinc to cadmium is at least 8:1 by weight and containing about 0.003 to 0.03% by weight of copper activator, the phosphor of said green emitting element having a dominant emission wave length of about 510 to 550 millimicrons, the phosphor of said blue emitting element having a dominant emission wave length of less than about 485 millimicrons.

11. Luminescent means for a color television picture reproducer comprising discrete areas of different phosphors, each phosphor area capable of emitting light in one of three different colors when excited with cathode rays, the first of said phosphors selected from the class consisting of zinc selenide and zinc cadmium selenide in which the ratio of zinc to cadmium is at least 8:1 by weight and containing about 0.003 to 0.03% by weight of copper activator; the second of said phosphors selected from the class consisting of zinc sulfide and zinc selenosulfide in which the ratio of sulfur to selenium is at least 8:1 by weight and containing about 0.005 to 0.025% by weight of silver activator and third of said phosphors being zinc silicate with manganese activator.

12. A kinescope for a color reproducer including a base plate having disposed on a surface thereof a multiplicity of groups of discrete phosphor elements arranged in a predetermined order of cyclic succession, each of said groups consisting of a red-emitting element in which the phosphor is selected from the class consisting of zinc selenide and zinc cadmium selenide in which the ratio of zinc to cadmium is at least 8:1 by weight, and containing about 0.003 to 0.03% by weight copper activator, a blue-emitting element in which the phosphor is selected from the class consisting of zinc sulfide and zinc selenosulfide in which the ratio of sulfur to selenium is at least 8:1 by weight, and containing about 0.005 to 0.025% by weight silver activator, and a green-emitting element in which the phosphor is zinc silicate with manganese activator.

13. A screen according to claim 1 wherein the phosphor of said red-emitting element consists essentially of zinc selenide with about 0.01% by weight of copper activator.

References Cited in the file of this patent

UNITED STATES PATENTS

| | | |
|---|---|---|
| 1,988,605 | Michelssen | Jan. 22, 1935 |
| 2,376,437 | Leverenz | May 22, 1945 |
| 2,477,070 | Leverenz | July 26, 1949 |
| 2,485,607 | Kasperowicz | Oct. 25, 1949 |
| 2,581,487 | Jenny | Jan. 8, 1952 |
| 2,625,734 | Law | Jan. 20, 1953 |

OTHER REFERENCES

Leverenz: Phosphors Versus the Periodic System of the Elements, Proceedings of the I. R. E., May 1944, pp. 256 to 263.